& Webb Patent Number: 5,022,700
Date of Patent: Jun. 11, 1991

United States Patent [19]
Fasiska et al.

[54] MOUNTING SYSTEM FOR AN AUTOMOBILE COVER

[75] Inventors: Edward J. Fasiska, Pittsburgh; Adam N. Aretz, Greensburg, both of Pa.

[73] Assignee: Auto Wrap, Inc., Pittsburgh, Pa.

[21] Appl. No.: 555,581

[22] Filed: Jul. 19, 1990

[51] Int. Cl.$^5$ .............................................. B60J 11/00
[52] U.S. Cl. ...................................... 276/98; 248/499; 160/26; 160/370.2; 224/42.45 R
[58] Field of Search .................................... 296/98, 136; 242/86.5 R; 248/499; 160/23.1, 26, 370.2; 150/166, 168; 224/42.45 R

[56] References Cited

U.S. PATENT DOCUMENTS 4,732,421  3/1988  Ross et al. .......................... 296/136
4,925,234  5/1990  Park et al. .......................... 296/136

FOREIGN PATENT DOCUMENTS 3245017  6/1984  Fed. Rep. of Germany ........ 296/98

Primary Examiner—Dennis H. Pedder
Attorney, Agent, or Firm—Webb, Burden, Ziesenheim & Webb

[57] ABSTRACT

A mounting system for an automobile cover containment housing wherein the housing includes a channel extending along a longitudinal axis thereof. A pair of mounting clips are slidably anchored in the channel of the containment housing. The mounting clips have a base at a first end for slidable travel in the channel and have a land section extending from said base with a slot formed therein. A flexible strap is attached to the slotted end of each of the mounting clips. Each of the straps are fitted with a detachable clip at the other end. A pair of permanent mounting clips are adapted to be attached within the trunk compartment of the automobile, preferably along the rear wall thereof to receive the detachable clips carried by the straps. The length of each strap is adjusted to permit the containment housing to rest adjacent the trunk opening with the outer edges of the mounting clips positioned along the outer edge of the trunk. When the trunk lid is closed, the flexible straps are covered thereby and surface portions of the land sections of the mounting clips are snugly engaged by the trunk lid. After the cover is removed from the automobile and reeled within the containment housing, the trunk lid is raised and the housing is swung into the trunk for storage purposes or the housing can be removed from the automobile by unsnapping the two detachable clips.

10 Claims, 3 Drawing Sheets

MOUNTING SYSTEM FOR AN AUTOMOBILE COVER

BACKGROUND OF THE INVENTION

The present invention relates generally to automobile covers and more particularly to systems for attaching a cover containment housing to the vehicle.

Automobile covers and containment or reeling housings are well-known in the art as evidenced by U.S. Pat. No. 4,848,823, owned by the assignee of the present invention, as well as by U.S. Pat. Nos. 4,856,842; 4,718,711; 4,657,298; and 1,719,055, for example. Past automobile covers have been used in combination with various types of rotatable reeling devices to permit more convenient application of the cover over the vehicle and for removing the cover for storage purposes. Generally, the containment or reeling housings of the prior art have required special mounting and fitting work for each model of automobile, which has proven to be both time consuming and expensive. In addition, theft is also a problem with automobile cover housings of the common type which are attached to the exterior of the vehicle.

The present invention solves these prior problems by providing a universal mounting system for an automobile cover having a minimum number of parts. The mounting system of the invention is adapted to be quickly and easily installed on automobiles of any common type with a minimum amount of time and expense. In addition, the automobile cover mounting system of the present invention provides improved theft resistance when the housing and cover are in the most vulnerable state, i.e., during use. Still further, the present invention provides a stable mounting system which rigidly holds the cover containment housing in a convenient and rigid orientation for the user. The present mounting system resists operational torque forces without the need for additional braces or hooks or the like, commonly employed in prior art devices. The invention further provides for convenient storage of the containment housing in the trunk of the automobile when not in use or allows for quick disconnection and complete removal thereof when so desired.

SUMMARY OF THE INVENTION

Briefly stated, the present invention is directed to a mounting system for an automobile cover containment housing wherein the housing includes a channel have a "T"-shaped slot extending along a longitudinal axis thereof. Preferably, a pair of mounting clips are slidably anchored in the channel of the containment housing. The mounting clips have a "T" or "H"-shaped base configuration at a first end for slidable travel in the channel and have a land section extending from the base portion with a slot formed therein. The clips are made from a cut-resistant and impact-resistant material such as a metal or high impact polymeric material to provide trouble-free service and theft resistance. A flexible, adjustable strap of a web nylon fabric, for example, is attached to the slotted end of each of the clips. Each of the straps is fitted with a detachable clip at the other end. A pair of permanent mounting clips are adapted to be attached within the trunk compartment of the automobile, preferably along the rear wall thereof to receive the detachable clips carried by the flexible straps. The length of each strap is adjusted by appropriate buckles to cause the containment housing to rest adjacent the outer edge of the trunk with the edges of the land section of the mounting clips positioned in abutting relation to the rubber sealing gasket thereof. Thus, when the trunk lid is closed, the straps, which are more susceptible to cutting and theft, are not exposed. As stated above, when the housing is in the operable position, only the rigid, cut-resistant land sections of the mounting clips are exposed. The adjustable straps, along with the laterally slidable mounting clips and easily installed permanent clips, permit the containment housing to be quickly fitted to virtually any automobile trunk configuration, thus providing a truly universal mounting system at minimal cost. After the cover is removed from the automobile and reeled within the containment housing, the trunk lid is raised and the housing is easily swung into the trunk by the user. If desired, the containment housing can be quickly removed from the automobile simply by unsnapping the two detachable clips from the permanent mounting clips within the trunk compartment.

Of course, if the containment housing has an electric motor for power-assist winding of the cover, a socket and plug arrangement is also provided to permit quick disconnection of the electrical wiring when the unit is to be removed from the trunk compartment.

DETAILED DESCRIPTION OF THE INVENTION

Figure 1:
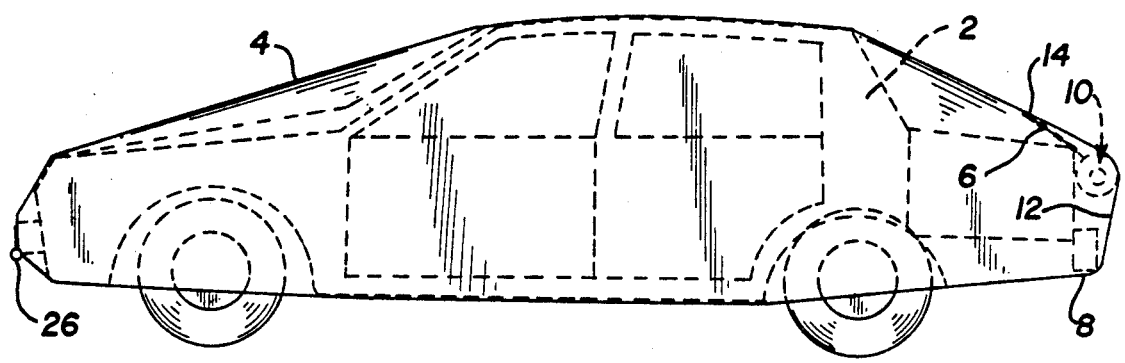
FIG. 1 is a side elevation of an automobile having a cover thereon and a containment housing attached to the rear of the automobile in accordance with one aspect of the present invention.

Referring now to the drawings, FIG. 1 shows a protective cover system for a vehicle 2 which includes a flexible cover 4, usually of a nylon material cut and sewn to suitable dimensions so as to fit over the entire vehicle from the front bumper to the rear bumper and around the sides thereof. An elastic ribbon is also usually sewn at the edges to provide a snug fit around the automobile. The flexible cover 4 may include a leader segment 6 attached at a first segment end to the cover at seam 14, spaced from a trailing edge 8 thereof. A second end of the leader segment 6 is attached to a rotatable spool housed in a containment tube or housing 10. The spool is selectively rotated for reeling in the cover by an electric motor positioned at end portion 11, all of which is more fully described in the jointly owned co-pending related applications: U.S. Ser. No. 07/261,037, filed Nov. 16, 1988 and U.S. Ser. No. 07/430,486, filed Nov.

1, 1989, the subject matter of which is incorporated by reference herein.

With this background in mind, the present invention is directed to a novel mounting system, generally designated 20, for attaching the containment housing 10 to the vehicle 2. The containment housing 10 is positioned outside the trunk compartment as shown in FIG. 1 when the cover 4 is to be withdrawn from the containment housing and also when the cover is to be removed and reeled into the housing. The containment housing 10 also preferably remains outside the trunk compartment when the automobile is parked and the cover 4 is in place, normally as depicted in FIG. 1. When the automobile is in the covered condition, the containment housing 10 is shielded from view by the aft section 12 of the cover 4 which extends from the attachment seam 14 rearwardly over the housing 10 to the trailing edge 8.

The mounting system 20 of the present invention perhaps best understood with reference to FIGS. 2-5. The containment housing 10 may be stowed in the trunk compartment 16 when the cover 4 is not in use, as shown in phantom lines in FIG. 3, or it may be completely removed from the automobile if desired, as will be explained in detail hereinafter. The mounting system 20 includes a channel 22 extending along a longitudinal axis of the containment housing 10. The channel 22 is spaced from a longitudinal opening 24 in the containment housing 10 which allows the cover 4 to enter and exit the containment housing for reeling on the motor-driven spool (not shown). A rigid control wand 26 is positioned adjacent to the slot 24 and is attached to the leader segment 6 of the cover 4. The user grasps the wand and directs the cover over the automobile. The channel 22 has a "T"-shaped slot 28 longitudinally extending along the length thereof.

Figure 2:
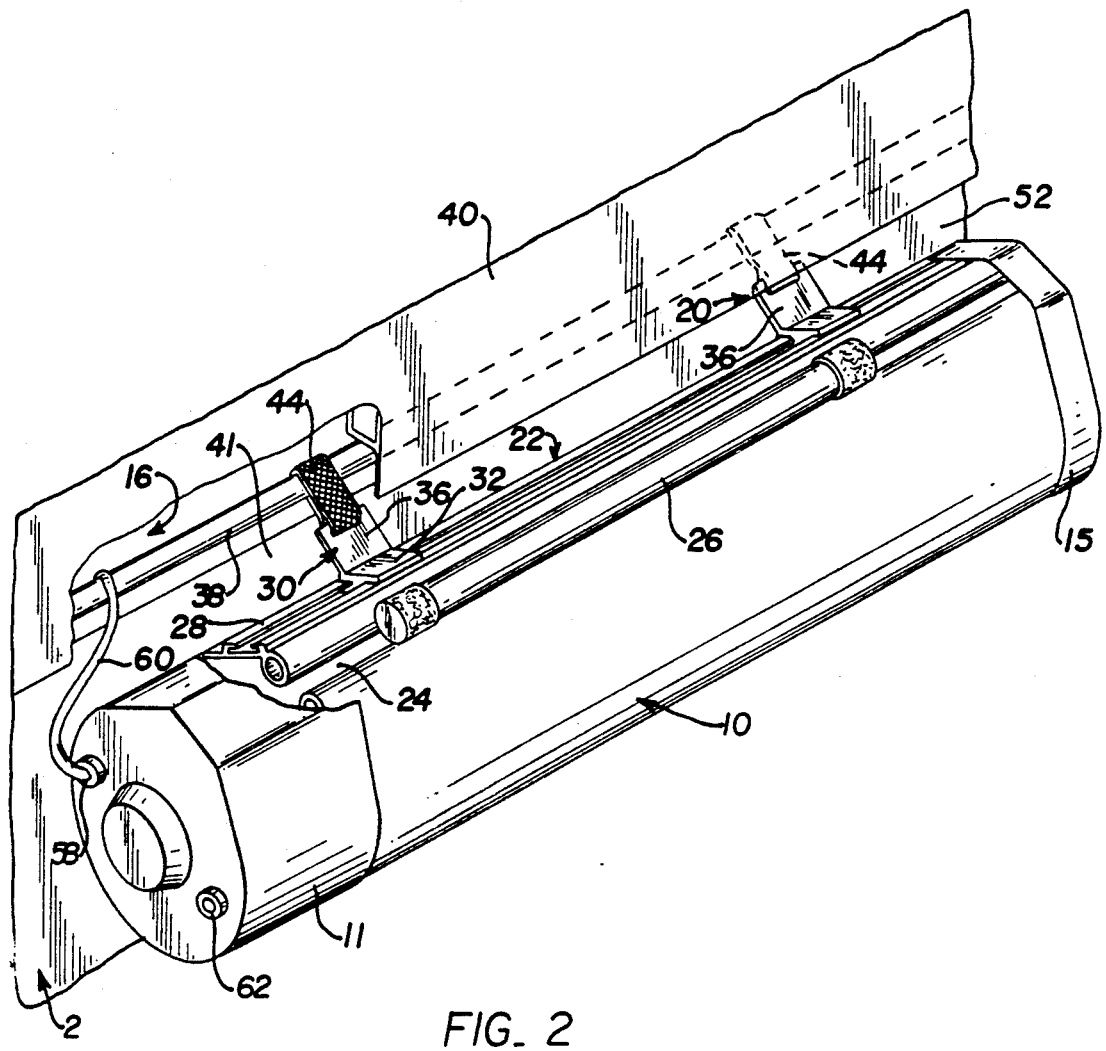
FIG. 2 is a partial isometric view of a rear portion of an automobile depicting the containment housing and mounting system of the present invention in place.
Figure 3:
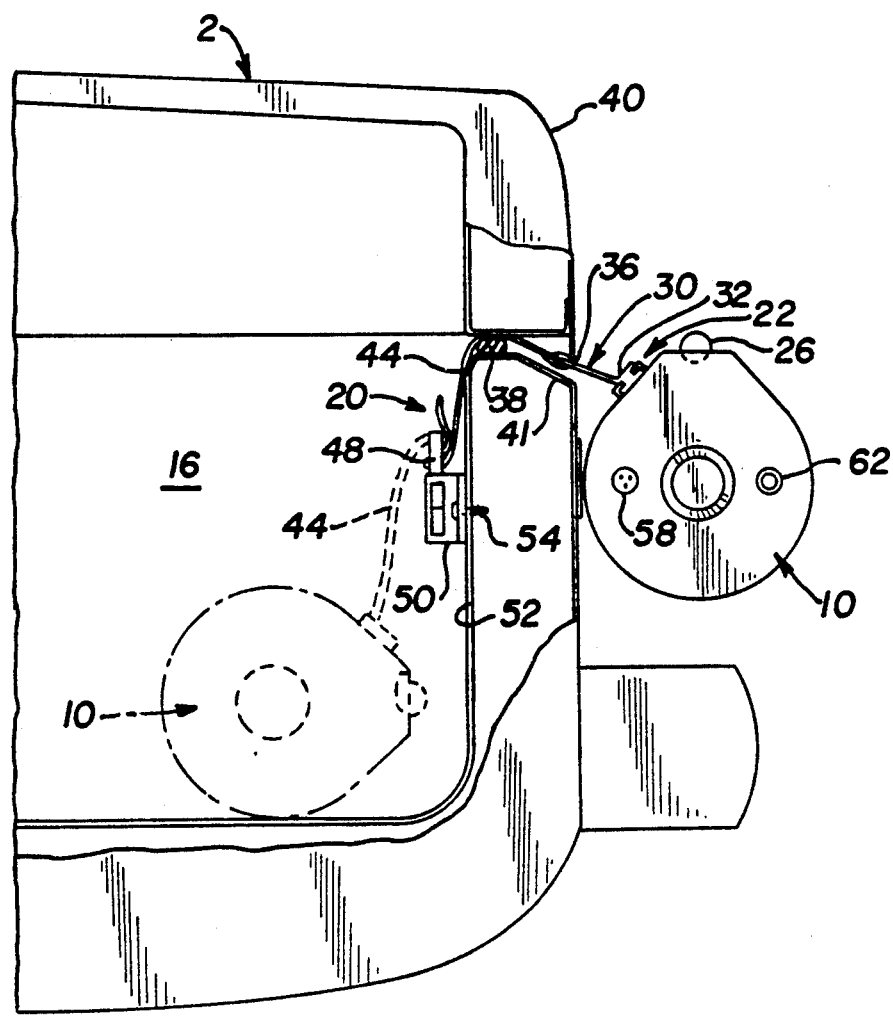
FIG. 3 is a partially fragmented side view of the rear trunk compartment of an automobile showing the containment housing and mounting system of the present invention in place thereon.
Figure 4:
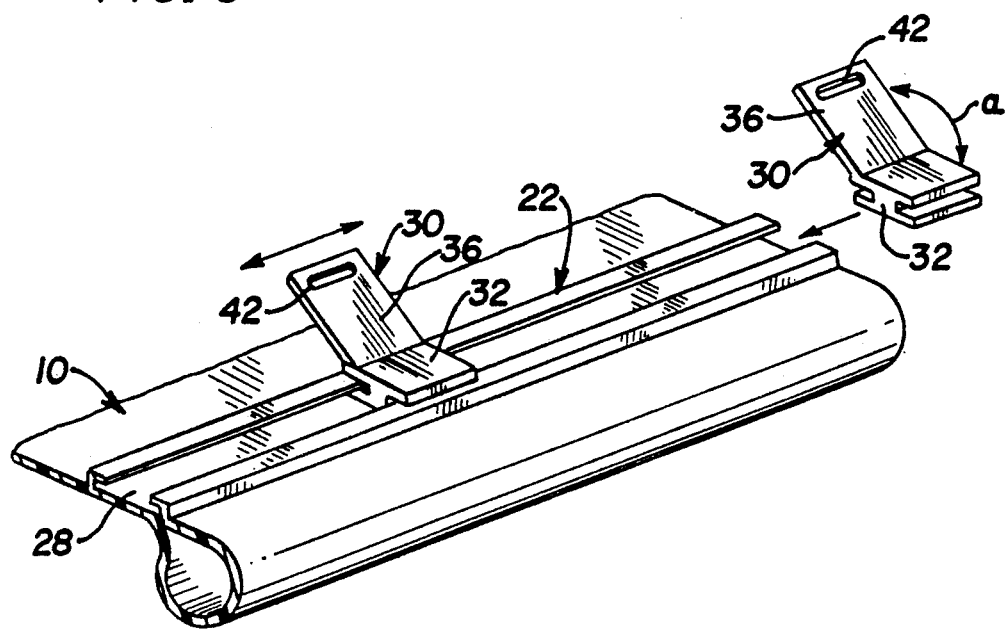
FIG. 4 is an enlarged, partially fragmented perspective view of one side of the containment housing having an integral, slotted channel and two slidable mounting clips of the present invention.

The slot 28 of the channel 22 slidably receives a pair of mounting clips 30 therein, FIGS. 2 and 4. As seen in FIG. 4, each mounting clip 30 has an "H"-shaped base portion 32 at a first end for slidable travel along the slot 28 of the channel 22. Each mounting clip 30 also has a land section 36 which may have a bent or arcuate shape defining a second end of the mounting clips 30. Each of the land sections 36 has a planar surface which is inclined at an angle "a", FIG. 4, of between about 90° to about 130° relative to the planar surface defined by the top surface of the base portion 32. A preferred angle "a" is about 110°. The outer edges of each of the land sections 36 of the mounting clips 30 are adapted to closely abut the rubber gasket 38 along a rear trunk edge 41 such that the trunk lid 40 engages surface portions of the land sections 36 when the trunk lid is closed, FIGS. 2 and 3.

The land section 36 of each mounting clip 30 also has a slot 42 formed therethrough to permit attachment of a flexible strap 44 of a fabric material, such as 1½ wide, web nylon, for example. A detachable male clip 48 is attached at the end of each of the straps 44. The clips 48 are of the quick detachable type and also include a buckle 46 or other means for adjusting the length of each of the straps. A pair of permanent female mounting clips 50, of conventional design, are attached to or along the rear wall 52 of the trunk compartment 16. The permanent clip 50 may be attached to the rear wall 52 or to any of the bracing structure commonly found in the trunk by way of conventional sheet metal fasteners 54, such as screws or rivets, or by other means such as adhesives or by way of a VELCRO ® type hook and loop attachment. The detachable clips 48 carrying the straps 44 are then inserted into the respective entry slots of the permanent clips 50 to support the containment housing 10. The entry slot of the female clip 50 is shown in FIGS. 3 and 5 as being oriented in an upward direction, but it is understood that the entry slot may also be oriented in a downward orientation, if desired.

The mounting system 20 of the invention thus provides a universal means for mounting the containment housing 10 on automobile trunks of substantially all configurations and sizes. In order to accommodate other unusual trunk deck and lid shapes as the occasion dictates and as new designs evolve, the angular orientation of clip 30 may be altered somewhat. The mounting clips 30 may also be removed from the channel slot 28 at the end thereof by removal of the housing end cap 15 and may then be reinserted in a reverse 180° orientation so as to achieve a different angular attitude in order to satisfy certain other automobile configurations. In addition, the end of the land section 36 of the mounting clip may be further modified to include a bent portion so as to make the clip 30 appear as a "Z"-shape profile (not shown) in order to accommodate certain low rise trunk-/bumper designs wherein the trunk lid nearly reaches the bumper.

Figure 5:
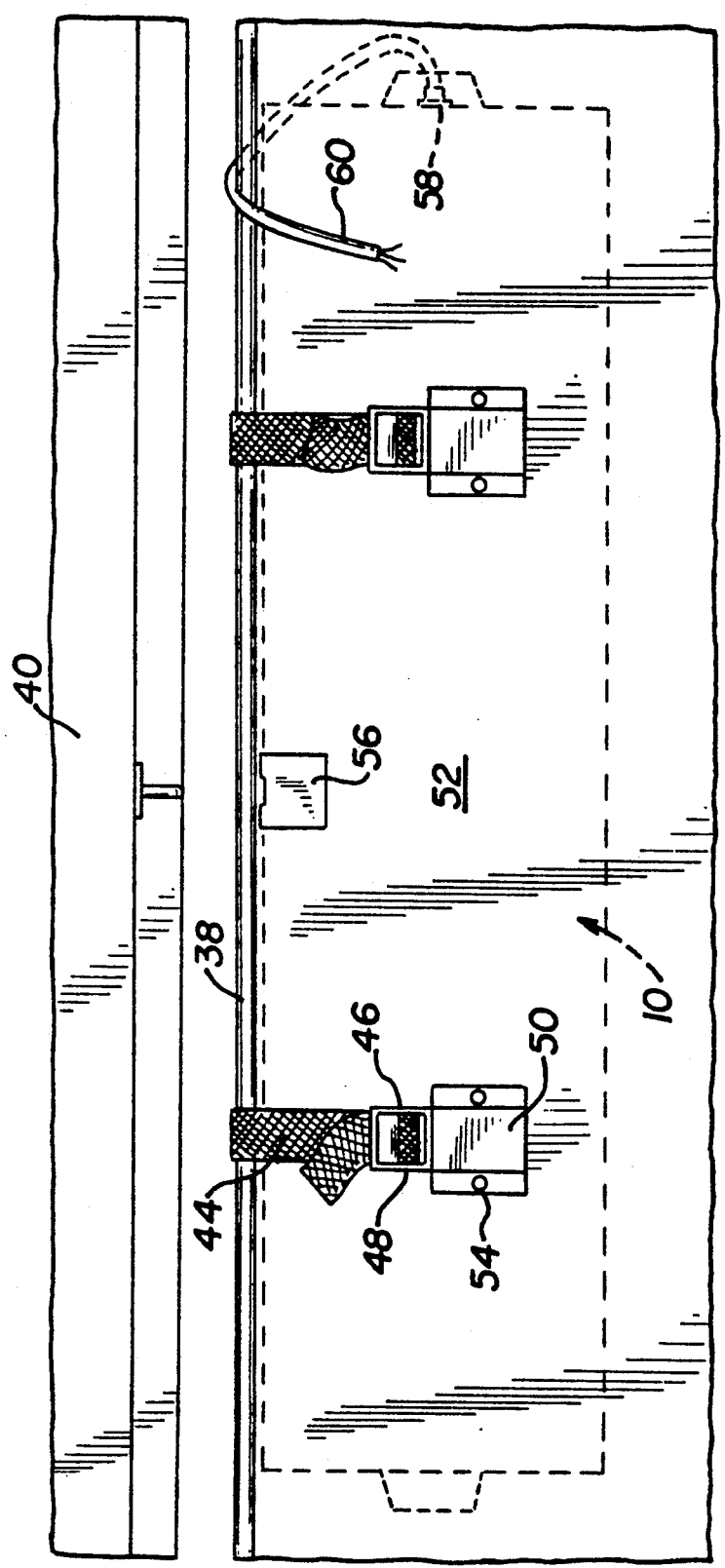
FIG. 5 is a rear elevation view of the mounting system of the present invention taken from the interior of the trunk compartment, as viewed toward the rear trunk wall.

In practice, the permanent clips 50 are first installed on or along the rear trunk wall 52 at a desired location, usually symmetrically spaced from the trunk latch mechanism 56, FIG. 5. The pair of straps 44 carrying the detachable clips 48 are then inserted within the permanent clips 50. The length of each strap 44 is then adjusted so that the forward edge of the land section 36 of each of the mounting clips 30 abuts or is closely spaced from the rubber gasket 38 of the trunk edge 41. This spacing may vary depending upon the specific trunk edge/gasket design, but in any event, the ends of the land sections 36 should ideally be positioned within an area of the rear trunk edge 41 which will be covered by the trunk lid so as to insure that the fabric straps 44 are also covered. The slot 28 in the channel 22 permits the slidable movement of the mounting clips 30 to adjust the spacing of the clips 30 to accommodate the spacing of the permanently mounted clips 50.

When properly mounted in this manner, the trunk lid 40 is closed and covers the straps 44 while engaging the ends of land sections 36 of the mounting clips 30 so as to snugly hold the mounting clips 30 and the attached containment housing 10 in place. The cover 4 may then be extracted from the housing 10 and applied around the automobile. Use of the pair of spaced clips 30 clamped firmly by the trunk lid 40 provides a balanced mounting arrangement for the containment housing 10 which resists twisting torque and inhibits lifting of the housing as the cover is being pulled out or while it is being reeled into the housing. The mounting clips 30 are relatively rigid and preferably constructed of a metal or a high-impact-resistant plastic material so as to withstand the torque loading imposed during service and also to resist theft attempts such as those caused by cutting or impact hammering. Presently preferred materials for the mounting clips 30 are polymeric coated steel, ABS/Styrene plastic, or glass fiber reinforced nylon. The preferred material for the quick disconnect clips 48 and 50 is a high-impact plastic which offers strength, light weight and corrosion resistance such as an ABS/Styrene blend.

The containment housing 10 is usually positioned at the rear of the trunk, as shown in FIG. 1, while the cover 4 is in place on the automobile. In some instances, however, such as in high crime areas, it may be desirable to store the containment housing 10 in the trunk compartment 16 while the cover is in place. In such instances, the leader segment 6 of the cover would require a cut-out segment therein so as to clear the latch mechanism 56, as described more fully in the commonly owned, co-pending application Ser. No. 07/430,486 filed Nov. 1, 1989.

If for any reason the user should require more space in the trunk compartment 16 or wish to transfer the unit to another automobile, the containment housing 10 is easily removed therefrom. The clips 48 are quickly unsnapped from the permanently mounted clips 50 (FIG. 5) and the electrical connection is, likewise, detached at plug assembly 58 which couples the motor at end cap 11 with the electrical line 60 of the automobile's electrical system, FIG. 2. The detached containment housing 10 is then easily lifted from the trunk compartment to provide a trouble-free and convenient conversion. Re-installation is similarly fast and simple, requiring only a re-connection of the clips 48 and 50 and the electrical plug 58. The slidable clips 30 are nearly self aligning to assure a proper, snug fit.

The co-axial orientation of the slot 28, of channel 22, with the containment housing 10 makes it advantageous to manufacture the housing and channel as an integral unit. Preferably, a polymeric material is extruded in a generally tube-like configuration to simultaneously form the containment housing and slotted channel. The open ends of the extruded tube shape forming the housing 10 are closed off with appropriate end caps at 11 and 15 which also close the ends of the slot 28 to prevent the unwanted removal of the mounting clips 30 therefrom.

As shown in FIG. 2, the motor end cap 11 of the containment housing 10 is also preferably provided with a key actuated switch 62 and an appropriate timing circuit which will energize the motor after a given time delay of, for example, from 10 to 20 seconds. After the key switch 62 is turned, the user has sufficient time to lift the trailing edge 8 and sides of the cover and walk to the front of the automobile to grasp the wand 26 prior to activation of the motorized reel. Of course, the motor can also be remotely activated by microwave transmission, as disclosed in our referenced co-pending applications.

While one presently preferred embodiment of the invention has been described herein, it will occur to those skilled in the art that other variations and modifications can be made thereto without departing from the spirit of the invention as defined in the appended claims.

What is claimed is:

1. A mounting system for an automobile cover containment housing comprising:
    channel means having slot means and extending along the containment housing;
    mounting clip means slidably positioned in said channel means;
    strap means having first and second ends, attached to said mounting clip means at a first end and carrying detachable clip means at a second end;
    permanent clip means adapted to be affixed to an interior portion of a trunk compartment of an automobile, whereby said detachable clip means is adapted to matingly engage said permanent clip means; and
    means for adjusting a length of said strap means, whereby, when a selected strap means length is obtained, a trunk lid, when moved to a closed position, substantially covers said strap means and engages a portion of said mounting clip means to resist movement of the containment housing and to deter theft of said housing.

2. The mounting system of claim 1 wherein the mounting clip means includes at least one mounting clip comprising a base portion having a configuration to slidably engage a configuration of said slot means in the channel means, said mounting clip also including a land section outwardly extending from the base portion and having a slot formed therein for attachment to the first end of the strap means.

3. The mounting system of claim 2 comprising two mounting clips having one of an "H"-shaped or "T"-shaped base configuration and wherein said channel means has a complementary shaped slot means configuration and wherein each of said land sections include a planar surface which is disposed at an angle relative to a plane defined by a top surface of said base portion.

4. The mounting system of claim 3 wherein the land section is disposed at an angle of between about 90° to about 130° relative to the plane of the top surface of the base portion.

5. The mounting system of claim 4 wherein the angle is about 110°.

6. The mounting system of claim 1 wherein the channel means extends along a longitudinal axis of the containment housing and wherein said channel means and containment housing are formed as an integral extrusion from a polymeric material having a generally tube-like shape.

7. The mounting system of claim 6 wherein opposed end portions of the integral channel means and containment housing are closed off by a pair of end caps, whereby, said end caps retain said mounting clip means within said channel means.

8. A mounting system for an automobile cover containment housing comprising,
    an extruded containment housing of a generally tube-like shape having an open gap extending along a longitudinal axis thereof, said open gap defining passage for said cover;
    a channel extruded integrally with said containment housing having a configured slot formed therein and extending along a longitudinal axis of said containment housing;
    a pair of mounting clips having a base portion of a configuration to slidably engage the configured slot of said channel for travel therein, each of said mounting clips including a land section outwardly extending from said base portion and each having a slot formed therein adjacent an outer edge of the land section;
    a pair of flexible straps, each having first and second ends and each attached at said first ends to the respective slots of the pair of mounting clips;
    a pair of detachable clips, each attached at the respective second ends of the pair of straps;
    a pair of spaced-apart permanent clips adapted to be affixed to an interior portion of a trunk compartment of an automobile, each of said pair of permanent clips adapted to matingly engage one of said pair of detachable clips; and
    buckle means associated with said detachable mounting clips for adjusting a length of each of said straps to obtain a desired strap length, whereby, said mounting clips are positioned in close proximity to a ledge portion of the trunk compartment such that when the trunk lid is closed said straps are substantially covered thereby.

9. The mounting system of claim 8 wherein the containment housing is adapted to include a motor for selectively reeling in said cover and further includes electrical plug means adapted to be detachably connected to an electrical circuit of said automobile to permit selective removal of said containment housing from said automobile by detaching said plug means and uncoupling said detachable clips from engagement with said permanent clips.

10. The mounting system of claim 9 wherein the mounting clips, detachable clips and permanent clips are made from polymeric materials and wherein said flexible straps are of a web nylon fabric.

* * * * *